United States Patent
Ambrose et al.

(10) Patent No.: US 9,688,876 B2
(45) Date of Patent: *Jun. 27, 2017

(54) SUBSTRATES AND ARTICLES OF MANUFACTURE COATED WITH A WATERBORNE 2K COATING COMPOSITION

(71) Applicant: PPG Industries Ohio, Inc., Cleveland, OH (US)

(72) Inventors: Ronald R. Ambrose, Loganville, GA (US); Anthony M. Chasser, Allison Park, PA (US); Mary Ann M. Fuhry, Butler, PA (US); Hongying Zhou, Allison Park, PA (US); Gregory J. McCollum, Gibsonia, PA (US); Irina G. Schwendeman, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 586 days.

This patent is subject to a terminal disclaimer.

(21) Appl. No.: 13/735,409

(22) Filed: Jan. 7, 2013

(65) Prior Publication Data

US 2013/0122223 A1 May 16, 2013

Related U.S. Application Data

(60) Division of application No. 12/056,304, filed on Mar. 27, 2008, now Pat. No. 8,389,113, and a continuation-in-part of application No. 10/245,028, filed on Sep. 17, 2002, now Pat. No. 7,763,354, and a continuation-in-part of application No. 11/020,921, filed on Dec. 23, 2004, now Pat. No. 7,906,199, and a continuation-in-part of application No. 11/172,718, filed on Jul. 1, 2005, now abandoned, and a continuation-in-part of application No. 11/461,844, filed on Aug. 2, 2006, now abandoned.

(51) Int. Cl.

| | | |
|---|---|---|
| C09D 175/04 | (2006.01) |
| B32B 9/02 | (2006.01) |
| B32B 27/08 | (2006.01) |
| B32B 9/04 | (2006.01) |
| B32B 5/02 | (2006.01) |
| B32B 27/06 | (2006.01) |
| B32B 1/00 | (2006.01) |
| B32B 27/40 | (2006.01) |
| B32B 25/08 | (2006.01) |
| A43B 1/00 | (2006.01) |
| C08F 8/00 | (2006.01) |
| C08G 18/08 | (2006.01) |
| C08G 18/09 | (2006.01) |
| C08G 18/12 | (2006.01) |
| C08G 18/48 | (2006.01) |
| C08G 18/50 | (2006.01) |
| C08G 18/66 | (2006.01) |
| C08G 18/70 | (2006.01) |
| C08G 18/75 | (2006.01) |
| C08G 18/79 | (2006.01) |
| D06N 3/14 | (2006.01) |
| A43B 23/02 | (2006.01) |

(52) U.S. Cl.
CPC .............. *C09D 175/04* (2013.01); *A43B 1/00* (2013.01); *A43B 1/0027* (2013.01); *A43B 23/0205* (2013.01); *B32B 1/00* (2013.01); *B32B 5/02* (2013.01); *B32B 9/025* (2013.01); *B32B 9/045* (2013.01); *B32B 25/08* (2013.01); *B32B 27/065* (2013.01); *B32B 27/08* (2013.01); *B32B 27/40* (2013.01); *C08F 8/00* (2013.01); *C08G 18/0823* (2013.01); *C08G 18/095* (2013.01); *C08G 18/12* (2013.01); *C08G 18/4833* (2013.01); *C08G 18/5024* (2013.01); *C08G 18/6692* (2013.01); *C08G 18/706* (2013.01); *C08G 18/758* (2013.01); *C08G 18/797* (2013.01); *D06N 3/14* (2013.01); *Y10T 428/1334* (2015.01); *Y10T 428/1397* (2015.01); *Y10T 428/249921* (2015.04); *Y10T 428/249991* (2015.04); *Y10T 428/31504* (2015.04); *Y10T 428/31551* (2015.04); *Y10T 428/31554* (2015.04); *Y10T 428/31558* (2015.04); *Y10T 428/31562* (2015.04); *Y10T 428/31569* (2015.04); *Y10T 428/31587* (2015.04); *Y10T 442/20* (2015.04)

(58) Field of Classification Search
USPC ........... 428/316.6, 319.3, 423.1; 36/102, 114
See application file for complete search history.

(56) References Cited

U.S. PATENT DOCUMENTS

| | | | |
|---|---|---|---|
| 2005/0049358 A1* | 3/2005 | Dai et al. ...................... 524/589 |
| 2006/0106189 A1* | 5/2006 | Hesselmans et al. .......... 528/71 |
| 2006/0141228 A1* | 6/2006 | Rearick et al. ............... 428/212 |

* cited by examiner

*Primary Examiner* — Hai Vo
(74) *Attorney, Agent, or Firm* — William J. Uhl

(57) ABSTRACT

A compressible substrate coated at least in part with a waterborne coating composition comprising at least one base neutralized active hydrogen containing film-forming resin and a water dispersible carbodiimide crosslinker capable of reacting with the film-forming resin to form a crosslinked film is disclosed. An article of manufacture having at least two different flexible substrates coated at least in part with such a coating is also disclosed.

9 Claims, No Drawings

SUBSTRATES AND ARTICLES OF MANUFACTURE COATED WITH A WATERBORNE 2K COATING COMPOSITION

CROSS-REFERENCES

This application is a divisional of U.S. patent application Ser. No. 12/056,304 filed Mar. 27, 2008 that is a continuation-in-part of U.S. patent application Ser. No. 10/245,028 filed Sep. 17, 2002 which issued as U.S. Pat. No. 7,763,354 on Jul. 27, 2010; U.S. patent application Ser. No. 11/020,921 filed Dec. 23, 2004 which issued as U.S. Pat. No. 7,906,199 on Jun. 29, 2006; U.S. patent application Ser. No. 11/172,718 filed Jul. 1, 2005 which was abandoned and U.S. patent application Ser. No. 11/461,844 filed Aug. 2, 2006.

FIELD OF THE INVENTION

The present invention relates to substrates and articles of manufacture coated at least in part with a base neutralized waterborne coating composition having carbodiimide crosslinkers.

BACKGROUND OF THE INVENTION

Many substrates, such as textiles, thermoplastic urethane, ethylene vinyl acetate foam and leather, have a significant amount of flexibility. It is often desirable to coat these substrates with a coating to improve appearance, water resistance, chemical resistance, scratch resistance, ultraviolet resistance and/or durability. It may also be desired to coat or otherwise "decorate" these substrates to provide an improved appearance, apply a pattern, and the like. Many coatings that improve these properties are rigid coatings suitable for use on rigid substrates. When a rigid coating, such as an acrylic coating, is applied to a flexible substrate, the coating will often crack and peel away from the substrate when the substrate is flexed. Accordingly, a flexible coating suitable for use on flexible substrates is desired.

Moreover, one or more flexible substrates are often combined as various components in an article of manufacture. It is often desirable to maintain color uniformity among these various components. However, when the components are made of different types of materials, it can be difficult to provide a uniform visual appearance of the article when the components are assembled.

For example, footwear such as athletic shoes often comprise different types of materials including natural leather, synthetic leather, vinyl, fabric, foam and/or rubber. A different coating composition is conventionally applied to each type of substrate material. For example, one type of coating may be applied to natural leather upper components of the shoe, and another type of coating may be applied to synthetic leather upper components of the shoe. Furthermore, it is common to incorporate pigments into foam midsoles of such shoes in order to impart color to the midsole and/or to provide uniformity and/or color coordination between the upper components of the shoe and the midsole. Such use of multiple specialized coatings and pigments may result in relatively complex and costly manufacturing processes, inventory issues and may also give rise to the need to "color match" the different coatings.

Color matching is a process by which the visual characteristics of more than one coating are "matched" such that the two or more coatings give the same or substantially same appearance. Color matching can be desired when, for example, two different substrates on the same article of manufacture are coated with two different coatings. Color matching can also be desired when trying to identify a coating that matches a previously coated article or component. For example, automotive body shops often paint repaired portions of autobodies with coating compositions selected to match the color of the original autobody paint; such color matched coatings often have different compositions from the original coatings, and may comprise significantly different types of coatings such as air-cured versus heat-cured coatings.

While color matched components may have substantially the same appearance in some viewing and illumination conditions, they may not maintain the same appearance when the viewing angle is changed, when the spectral distribution of the light source is changed and/or when the coatings have aged. For example, some color matched components may have the same appearance in daylight conditions, but may not match under fluorescent and/or incandescent lighting. When a color match is dependent on illumination or viewing condition, the match is termed conditional or "metameric".

It would be desirable to provide a coating composition capable of coating various different types of substrates of an article of manufacture while eliminating the need to do color matching.

SUMMARY OF THE INVENTION

The present invention is directed to a compressible substrate coated at least in part with a waterborne coating composition comprising: a) at least one base neutralized active hydrogen containing film-forming resin; and b) a water dispersible carbodiimide crosslinker capable of reacting with the film-forming resin to form a crosslinked film.

The present invention is further directed to an article of manufacture comprising: a) a first substrate comprising a first flexible material; and b) a second substrate comprising a second flexible material different from the first flexible material wherein at least a portion of the first substrate and at least a portion of the second substrate are coated with a waterborne coating composition comprising: i) at least one base neutralized active hydrogen containing film-forming resin; and ii) a water dispersible carbodiimide crosslinker capable of reacting with the film-forming resin to form a crosslinked film.

DETAILED DESCRIPTION OF THE INVENTION

The present invention is directed to a compressible substrate coated at least in part with a waterborne coating composition. The waterborne coating composition used according to the present invention comprises at least one base neutralized active hydrogen containing film-forming resin. "Base neutralized" and like terms indicate that a base is utilized to neutralize at least some of the active hydrogen containing film-forming resin. Suitable bases include amines and inorganic bases like lithium hydroxide and potassium hydroxide. Suitable amines include ammonia and any primary, secondary, and tertiary amines. Tertiary amines are particularly suitable.

The base can be present in the waterborne coating composition in an amount necessary to neutralize the active hydrogen containing film-forming resin from 60 to 170 percent. A 100 percent neutralization means that the mole ratio of base to acid is 1:1, and a 70 percent neutralization means that the mole ratio of base to acid is 7:10.

"Active hydrogen containing" and like terms indicate that the film-forming resin has a group capable of reacting with a carbodiimide group such as a carboxyl group, an alcoholic hydroxyl group, a phenolic hydroxyl group, and/or a thiol. Suitable active hydrogen containing film-forming resins include polyesters, polyurethanes, (meth)acrylic polymers, polyamides, polycarbonates and/or polyethers. The polymers used as the film-forming resin in the present invention can be prepared with unreacted carboxylic acid groups to impart acid functionality.

Suitable (meth)acrylic polymers include copolymers containing carboxylic acid groups and acid groups of sulfur and phosphorus. These (meth)acrylic polymers and ways of preparing them are well known in the art. For example, these (meth)acrylic polymers can be synthesized from acid monomers and one or more alkyl esters of (meth)acrylic acid. Suitable acid monomers include: (meth)acrylic acid, maleic acid, fumaric acid, crotonic acid, itaconic acid, 2-sulfo ethyl methacrylate, 2-acrylamido-2-methyl-1-propane sulfonic acid, (meth)acrylamido methyl phosphonic acid, and 2-phosphoethyl (meth)acrylate. The presence of these acid groups facilitates dispersing the acrylic polymer in water in the presence of a base neutralizing compound. Monoalkyl esters of maleic acid, fumaric acid, and itaconic acid can also be used to synthesize the acrylic polymers. As will be appreciated by, and as is conventional to those skilled in the art, (meth)acrylic acid includes both acrylic acid and the coordinating methacrylic acid; the same is true for other compounds with the prefix "(meth)".

Suitable alkyl esters of (meth)acrylic acid include aliphatic or cycloaliphatic alkyl esters containing from 1 to 30 carbon atoms in the alkyl groups, such as 4 to 18 carbon atoms in the alkyl group. Methyl (meth)acrylate, ethyl (meth)acrylate, butyl(meth)acrylate, 2-ethyl hexyl (meth) acrylate, and hydroxy ethyl (meth)acrylate are all examples of suitable alkyl esters of (meth)acrylic acid.

Suitable (meth)acrylic polymers further include copolymers synthesized from one of the above-mentioned monomers and one or more of the following polymerizable ethylenically unsaturated monomers: vinyl aromatic compounds such as styrene and vinyl toluene; nitriles such as (meth)acrylonitrile; amides such as (meth)acrylamide; vinyl and vinylidene halides such as vinyl chloride; and vinylidene chloride and vinyl esters such as vinyl acetate.

Polyesters and alkyd resins that can be utilized as the film-forming resin in the present invention and methods of preparing them are well know in the art. For example, the polyester can be prepared via condensation of a polyhydric alcohol and a polycarboxylic acid. Suitable polyhydric alcohols include ethylene glycol, propylene glycol, butylene glycol, 1,6-hexylene glycol, neopentyl glycol, diethylene glycol, glycerol, trimethylol propane and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid.

Polyesters and alkyd resins can also be formed from an acid of sulfur and/or phosphorus, as is well know in the art. Suitable acids of sulfur and phosphorus include 2-phosphonobutane-1,2,4-tricarboxylic acid, and 5-sulfo isophthalic acid.

Polyurethanes that can be used in the film-forming resin of the present invention and methods of preparing them are well known in the art. For example, the polyurethane can be prepared by reacting a polyester polyol, polycarbonate polyol, polyether polyol or acrylic polyol with a polyisocyanate and an acid functional polyol such that the OH/NCO ratio is greater than 1:1, neutralized with an amine then dispersed into water. Alternately, the polyurethane can be prepared by reacting said polyol, isocyanate and acid functional polyol with an isocyanate such that the OH/NCO equivalent ratio is less than 1:1, dispersing the prepolymer in water containing an isocyanate chain extender and a neutralizing amine. Polyurethanes prepared in this manner are generally preferred because of their inherent flexibility. Suitable polyisocyanates include aliphatic polyisocyanates, aromatic polyisocyanates, and mixtures thereof.

The active hydrogen containing film-forming resin used in the present invention can have a weight average molecular weight greater than 1,000 and a number average molecular weight greater than 500, both as determined by gel permeation chromatography using a polystyrene standard. The active hydrogen containing film-forming resin used according to the present invention can have an acid value ranging from 5 mg KOH/g to 738 mg KOH/g, such as 10 mg KOH/g to 200 mg KOHg, or 10 mg KOH/g to 45 mg KOH/g or any other combination of numbers within any of these ranges.

The active hydrogen containing film-forming resin can be present in the waterborne coating composition in an amount ranging from 10 to 100 weight percent, such as 45 to 85 weight percent, where the weight percent is determined from the ratio of resin solids in the active hydrogen containing film-forming resin to the total resin solids of the composition.

The waterborne coating composition used in the present invention also comprises a water dispersible carbodiimide crosslinker. "Water dispersible" and like terms, when used in conjunction with carbodiimide, refer to carbodiimide dissolved or dispersed in aqueous phase. In order to utilize certain carbodiimides in the present invention, it may be necessary to modify the carbodiimides to make them water dispersible. Techniques for modifying carbodiimides to make them water dispersible are well known in the art.

Suitable water dispersible carbodiimide crosslinkers include an aliphatic and/or aromatic dinitrogen analogue of carbonic acid of the generalized structure: $RN=C=NR_1$ where R and $R_1$ are independently hydrogen, aliphatic or aromatic groups. The aliphatic groups comprise alkyl chains and can include a carbodiimide such as dicyclohexyl carbodiimide. Oligomeric or polymeric carbodiimide crosslinkers can also be used.

The preparation of water dispersible carbodiimide crosslinkers is well known in the art. Suitable water dispersible carbodiimide crosslinkers can be prepared by incorporating minor amounts of an amine, such as dimethyl aminopropylamine, and an alkyl sulfonate or sulfate into the carbodiimide structure. Suitable water dispersible carbodiimides can also be prepared by incorporating polyethylene oxide or polypropylene oxide into the carbodiimide structure.

Suitable water dispersible carbodiimides are commercially available. For example, UCARLINK XL-29SE, XL-20 commercially available from Union Carbide and CARBODILITE VO2-L2 commercially available from Nisshinbo Industries, Inc. can be used in the present invention.

The amount of the dispersed carbodiimide in the aqueous medium can be at least 1 percent by weight based on the weight of the aqueous dispersion, such as from 2 to 60 percent by weight based on the weight of the aqueous dispersion.

In the waterborne coating composition used in the present invention, the water dispersible carbodiimide crosslinker can be present in amounts ranging from 5 to 50, such as 10 to 35 or 15 to 25, weight percent resin solids based on total resin solids.

Optionally, the waterborne coating composition used in the present invention comprises a water dispersible polyisocyanate. "Water dispersible" and like terms, when used in conjunction with polyisocyanate, refer to polyisocyanate dissolved or dispersed in aqueous phase. In order to utilize certain polyisocyanates in the present invention, it may be necessary to modify the polyisocyanates to make them water dispersible. Techniques for modifying polyisocyanates to make them water dispersible are well known in the art.

Suitable water dispersible polyisocyanates include multifunctional isocyanates and diisocyanates. Suitable multifunctional isocyanates include a wide variety of monomeric and oligomeric polyfunctional isocyanates. Examples include the biuret adduct of 3 molecules of a diisocyanate, the adduct of an at least trifunctional polyol with 1 molecule of a diisocyanate per hydroxyl equivalent, isocyanurate group-containing compounds, 1,3,5-triisocyanatobenzene, 2,4,6-triisocyanatoluene, and uretdione.

The waterborne coatings of the present invention can further comprise one or more additives typically added in the art. Such additives can include colorants, plasticizers, anti-oxidants, hindered amine light stabilizers, UV light absorbers and stabilizers, surfactants, flow control agents, thixotropic agents, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and biphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference. Colorants also include transparent pigments such as those commercially available from Clariant.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

Other suitable coating components include one or more texture-enhancers that improve the surface feel and/or that enhance stain resistance of the coating. In one non-limiting embodiment, the texture-enhancer imparts a soft feel to the coating. As used herein, the term "soft feel" means the coated substrate exhibits an altered tactile property such as a simulated velvet or leather tactile feel when touched. The texture-enhancer can be an additive that can be added to the coating composition such as silica flattening agents and/or wax additives. Example silica flattening agents can include ACEMATT OK 412 and ACEMATT TS 100 commercially available from Degussa, Inc. Example wax additives can include polytetraethylene oxide, fluorinated waxes, polyethylene waxes and natural waxes such as paraffin and/or carnauba. In another non-limiting embodiment, the texture-enhancer can be incorporated within the polyurethane resin itself. For example, components that will impart a larger "soft-segment" to the polyurethane can be used. Examples include polytetramethylene ether glycol commercially available under the name TERATHANE 2000 from Invista, Inc.

As noted above, the present invention is directed to a compressible substrate coated at least in part with one or more of the waterborne coating compositions described herein. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. A compressible substrate is one, for example, that has a compressive strain of 50% or greater, such as 70%, 75% or 80% or greater. Particular examples of compressible substrates include those comprising foam and polymeric bladders filled with air, liquid, and/or plasma.

"Foam" can be a polymeric or natural material comprising open cell foam and/or closed cell foam. "Open cell foam" means that the foam comprises a plurality of interconnected air chambers; "closed cell foam" means that the foam comprises discrete closed pores. Example foams include but are not limited to polystyrene foams, polyvinyl acetate and/or copolymers, polyvinyl chloride and/or copolymers, poly(meth)acrylamide foams, polyvinylchloride foams, polyurethane foams, thermoplastic urethane foams, and polyolefinic foams and polyolefin blends. Polyolefinic foams include but are not limited to polypropylene foams, polyethylene foams and ethylene vinyl acetate ("EVA") foams. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface.

The present invention is further directed to an article of manufacture comprising: a) a first substrate comprising a first flexible material; and b) a second substrate comprising a second flexible material different from the first flexible material wherein at least a portion of the first substrate and at least a portion of the second substrate are coated with a waterborne coating composition comprising: i) at least one base neutralized active hydrogen containing film-forming resin; and ii) a water dispersible carbodiimide crosslinker capable of reacting with the film-forming resin to form a crosslinked film. The waterborne coating composition can be any of the compositions described above.

The term "flexible substrate" refers to a substrate that can undergo mechanical stresses, such as bending, stretching and the like without significant irreversible change. In certain embodiments, the flexible substrates are compressible substrates, as described above. Other flexible substrates include non-rigid substrates, such as woven and nonwoven fiberglass, woven and nonwoven glass, woven and nonwoven polyester, thermoplastic urethane (TPU), synthetic leather, natural leather, finished natural leather, finished synthetic leather, rubber, urethane elastomers, synthetic textiles and natural textiles. "Textiles" can include natural and/or synthetic textiles such as fabric, vinyl and urethane coated fabrics, mesh, netting, cord, yarn and the like, and can be comprised, for example, of canvas, cotton, polyester, KEVLAR, polymer fibers, polyamides such as nylons and the like, polyesters such as polyethylene terephthalate and polybutylene terephthalate and the like, polyolefins such as polyethylene and polypropylene and the like, rayon, polyvinyl polymers such as polyacrylonitrile and the like, other fiber materials, cellulosics materials and the like.

In a non-limiting embodiment of the present invention, the article of manufacture comprises footwear. As used herein, the term "footwear" includes athletic and sport shoes, men's and women's dress shoes, men's and women's casual shoes, children's shoes, sandals, flip flops, boots, work boots, outdoor footwear, orthopedic shoes, slippers and the like. Examples of footwear components include soles, midsoles, upper materials and liners. As a particular non-limiting example, athletic shoes may comprise natural leather, synthetic leather and/or textile uppers, and EVA foam midsoles.

As used herein, the term "coating" means a material that forms a substantially continuous layer or film on a substrate. Coatings can be applied to flexible substrates, including but not limited to textiles, in any desired thickness, such as a thickness suitable to achieve a desired mechanical and/or visual effect. In one non-limiting embodiment, the coatings may seep into a portion of the surface of the flexible substrate while maintaining a coating on the exterior surface of the flexible substrate. In certain embodiments the exterior surface of the flexible substrate is coated all or in part. By "exterior surface" is meant a surface that is at least partially exposed upon assembly of the flexible substrate into a finished product. Examples related to the use of textiles include the exterior surface of an article of clothing or the exterior surface of a floor covering. Examples related to footwear include that portion of the shoe midsole or other shoe component that is visible in the finished shoe; that is, when all of the shoe components are assembled. Thus an external surface is not one that gets covered, and thereby concealed, by another component, unless at least a part of that surface remains unconcealed and/or is visible on the exterior or outside of the final product.

The coating compositions used according to the present invention are suitable for producing any type of coating, and are particularly suitable as topcoats on substrates. In one embodiment, the coatings of the present invention can be used as a single application coating or monocoat. In another embodiment, the coating can be used as one or more of a multiple layer coating in which each coat may contain the same or different additives. The coatings of the present invention can be used alone or in combination with other coatings. In certain embodiments, it may be desirable to use an adhesion promoter layer on the substrate to be coated. In certain embodiments it may be desired to apply to the substrate one or more coatings described above in a design or pattern. Such designs and/or patterns can use one color, or two or more colors of the coatings described above. In certain embodiments it may be desired to apply one or more coatings to substantially all of the substrate. In this manner, a color or colors can be imparted to the substrate.

The coating compositions used according to the present invention can be applied to flexible substrates, including textiles, in any known manner such as brushing, spraying, rolling, roll coating, slot coating and/or dipping. The coatings can also be applied by any known manner of dying, printing, or coloring, such as silk-screening, ink-jet printing, jet dying, jet injection dying, transfer printing and the like. Such methods can be computer controlled, as will be understood by one skilled in the art, and may involve pixel-wise application of color to a substrate such as is discussed in U.S. Pat. Nos. 6,792,329 and 6,854,146, both of which are incorporated by reference in their entirety. A "pixel" is the smallest area or location in a pattern or on a substrate that can be individually assignable or addressable with a given color. For example, such methods can be used to print a pattern and/or color onto a substrate; a "pattern" on a substrate can mean that the substrate has been colored, such as on a pixel-by-pixel basis, by application of a colorant to the substrate, typically in a predetermined manner. In the various methods for dying, printing or otherwise imparting color to a substrate, computers and digital design software can be used to develop a digital design that is fed to a digitally controlled dying, printing or coloring apparatus; such apparatus are commercially available and can be used in accordance with the manufacturers' instructions.

The curing of these coatings can comprise a flash at ambient or elevated temperatures followed by a thermal bake in order to obtain optimum properties. The coatings of the present invention are typically deposited on the flexible substrate to a thickness of from 0.1 to 3 mils. In one embodiment, the coating is deposited to a thickness of from 0.5 to 1.0 mils.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" compressible substrate, "a" base neutralized active hydrogen containing film-forming resin and "a" carbodiimide, one or more of each of these and any other components can be used. As used herein, the term "polymer" refers to oligomers and both homopolymers and copolymers, and the prefix "poly" refers to two or more. Including and like terms means including but not limited to.

EXAMPLES

The present invention will be further illustrated by the non-limiting examples below. Table 1 contains formulation data for waterborne coating compositions according to the present invention. Table 2 describes the crosslinker system utilized in the exemplary coating systems. Table 3 lists the pot lives of various crosslinked waterborne coating systems.

The exemplary coating compositions according to the present invention were prepared by taking 100 g of a commercially available basecoat composition and then adding a certain amount of base. Amine was used as the base in the exemplary compositions. The basecoat and amine were then mixed to form the coating composition of the present invention. Specific compositional information for the Examples is shown below in Table 1.

TABLE 1

The Waterborne Coating Composition of the Present Invention

| Example | T408 Black BC[1] | Dimethyl Ethanol Amine[2] | % Neutralized[5] | Approximate pH[6] |
|---|---|---|---|---|
| 1 | 100 g | None | 77.1 | 7.24 |
| 2 | 100 g | 0.10 g | 93.2 | 8.28 |
| 3 | 100 g | 0.20 g | 109.2 | 8.58 |
| 4 | 100 g | 0.25 g | 117.2 | 8.76 |
| 5 | 100 g | 0.30 g | 125.2 | 8.92 |
| 6 | 100 g | 0.35 g | 133.3 | 9.04 |
| 7 | 100 g | 0.40 g | 141.3 | 9.10 |
| 8 | 100 g | 0.50 g | 157.3 | 9.24 |
| | T413 Blue BC[3] | | | |
| 9 | 100 g | None | 95.2 | 7.71 |
| 10 | 100 g | 0.20 g | 122.0 | 8.70 |
| 11 | 100 g | 0.50 g | 162.0 | 9.17 |
| | T400 White BC[4] | | | |
| 12 | 100 g | None | 90.9 | 8.25 |
| 13 | 100 g | 0.20 g | 113.6 | 8.74 |
| 14 | 100 g | 0.50 g | 147.6 | 9.25 |

[1]T408 Envirobase ® Black basecoat commercially available from PPG Industries, Inc.
[2]Dimethyl ethanol amine is a hydroxyl amine commercially available from Huntsman Petrochemicals.
[3]T413 Envirobase ® Blue basecoat commercially available from PPG Industries, Inc.
[4]T400 Envirobase ® White basecoat commercially available from PPG Industries, Inc.
[5]The equivalence of acid in basecoat divided by the equivalence of amine multiplied by 100.
[6]Two different sets of examples were formed using T408 Envirobase ® Black basecoat. The pH values are for only one set of data. The maximum variation between pH values in the different set of examples was ±0.27.

TABLE 2

Crosslinker Systems Utilized in the Exemplary Coating Systems
The following components were mixed together to form the crosslinker systems used in the exemplary coating systems.

| Component | Crosslinker System #1 | Crosslinker System #2 |
|---|---|---|
| Bayhydur VPLS 2319[1]/ PM acetate[2] Blend (3:1 by weight) | 2.0 | |

TABLE 2-continued

Crosslinker Systems Utilized in the Exemplary Coating Systems
The following components were mixed together to
form the crosslinker systems
used in the exemplary coating systems.

| Component | Crosslinker System #1 | Crosslinker System #2 |
|---|---|---|
| UCARLNK XL-29SE[3] | 2.5 | 2.5 |
| Deionized Water | 25.5 | 27.5 |

[1]A polyisocyanate product commercially available from Bayer Corporation.
[2]A solvent which is commercially available from Eastman Chemical Company.
[3]A carbodiimide product commercially available from Union Carbide Corporation.

TABLE 3

Exemplary Waterborne Coating Systems

| Coating Composition of Example | Amount of Coating Composition | Crosslinker System # | Amount of Crosslinker | Potlife[1] |
|---|---|---|---|---|
| 1 | 70 g | 1 | 30 g | 10 minutes |
| 2 | 70 g | 1 | 30 g | 45 minutes |
| 3 | 70 g | 1 | 30 g | 75 minutes |
| 4 | 70 g | 1 | 30 g | 75 minutes |
| 5 | 70 g | 1 | 30 g | 120 minutes |
| 6 | 70 g | 1 | 30 g | 120 minutes |
| 7 | 70 g | 1 | 30 g | 120 minutes |
| 8 | 70 g | 1 | 30 g | 120 minutes |
| 1 | 70 g | 2 | 30 g | 3 minutes |
| 2 | 70 g | 2 | 30 g | 30 minutes |
| 3 | 70 g | 2 | 30 g | 60 minutes |
| 4 | 70 g | 2 | 30 g | 100 minutes |
| 5 | 70 g | 2 | 30 g | 120 minutes |
| 6 | 70 g | 2 | 30 g | 210 minutes |
| 7 | 70 g | 2 | 30 g | 300 minutes |
| 8 | 70 g | 2 | 30 g | >300 minutes |
| 9 | 70 g | 1 | 30 g | 30 minutes |
| 10 | 70 g | 1 | 30 g | 150 minutes |
| 11 | 70 g | 1 | 30 g | >180 minutes |
| 12 | 70 g | 1 | 30 g | 180 minutes |
| 13 | 70 g | 1 | 30 g | >240 minutes |
| 14 | 70 g | 1 | 30 g | >240 minutes |

[1]The pot-life was determined by the following method. Initially, the basecoat and crosslinker system was combined in a container (time = 0). The container was then tipped over at various time intervals (for example, 10 mins, 25 mins, 40 mins, etc.) to check for liquid flow. The time at which the container was tipped over and the liquid was no longer flowing was recorded as the pot life.

Conclusions

The present invention provides a waterborne coating composition having good pot life. As shown in Table 3 above, the pot-life of crosslinked waterborne coating compositions according to the present invention can be increased by increasing the % neutralization of the waterborne coating composition.

Example A

A water-based polycarbodiimide resin "A" was made as follows:

TABLE 4

| Ingredients | Parts by Weight |
|---|---|
| Charge #1 | |
| Desmodur W[1] | 16.68 |
| Phospholene oxide | 0.25 |
| Charge #2 | |
| Dibutyltin dilaurate | 0.0015 |
| Charge #3 | |
| N-Methylpyrrolidone | 10.13 |
| Ethylene glycol | 0.62 |
| Charge #4 | |
| Jeffamine M1000 (XTJ-506)[2] | 18.22 |
| Charge #5 | |
| Deionized water | 51.84 |
| Abex 2005[3] | 2.25 |

[1]Desmodur W is methylene-bis-(4-cyclohexyldiisocyanate) from Bayer Materials Science, LLC.
[2]Jeffamine M1000 is a polyetheramine from Huntsman (mole ratio of EO/PO = 6.3, MW = 1000).
[3]Abex 2005 is a proprietary anionic surfactant from Rhodia.

Charge #1 was added to a 2-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and Charge #2 was added. Charge #3 was added over 10 min and the reaction mixture was held at 90-100° C. until the NCO equivalent weight stalled at about 1300 eq/g. Charge #4 was added and the mixture was held at 90-100° C. until IR spectroscopy showed the absence of the characteristic NCO band. The batch was cooled to 60-65° C., and Charge #5, after being preheated to 60-65° C., was added to the reaction flask over 20 min while maintaining the temperature below 65° C.

A sample of the polycarbodiimide dispersion was placed in a 120° F. hot room for 4 weeks, and the resin remained dispersed.

Example 15

A thermosetting water-based composition comprising a carboxylic acid group containing polyurethane and the polycarbodiimide of Example A was prepared. The composition was prepared from the following ingredients.

| Ingredient | Amount in Grams Ex. 13 |
|---|---|
| Polyurethane Dispersion[1] | 160 |
| T-14 Fire Orange[2] | 10 |
| TEGO WET 280[3] | 3 |
| BYK 425[4] | 0.3 |
| BYK 011[5] | 1 |
| Polycarbodiimide of Example A | 47 |

Polyurethane Dispersion was prepared by reacting in methylethylketone (MEK) solvent isophorone diisocyanate with a polyether diol (POLYMEG 2000) and dimethylol propionic acid (2.85:0.95:1.27 equivalent ratio) to give an NCO-prepolymer having an NCO equivalent of 2663 and an acid value of 21.1. The NCO prepolymer was chain extended in water with adipic dihydrazide and partially neutralized with dimethyl-ethanol amine and vacuum stripped of the MEK to give a 34.66% by weight resin solids dispersion.
[2]Orange Pigment from Dayglo Color Corp.
[3]Silicon flow additive from Goldschmidt Chemical.
[4]Rheology agent from BYK Chemie.
[5]Degassing agent from BYK Chemie.

The thermosetting composition was spray applied to a substrate as mentioned below, cured at 170° C. for 20 minutes to give a cured coating having a film build of about 1 mil. The coated substrate was tested for flexibility and compression resistance. The results of the testing are reported below:

| Example | Compression[1] | Flexibility[2] |
|---------|----------------|----------------|
| 15 | Pass | Greater than 40,000 |

[1]The compression test is a test devised by NIKE Corp., (KIM Compression) which measures repeated compression simulating the up and down running motion compressing the shok column of an athletic shoe. A flexible polyurethane substrate of approximately 2.5 square centimeters and 2.5 centimeters in thickness coated as described above is placed in a holder and a plate directly above the holder impacts the sample to the extent that the materials is now compressed 50% of its original heights. The compressed dimensions would therefore be approximately 2.5 × 2.5 × 1.75 centimeters. The impacting/compressing repeats itself 5-10 times per second and continues until either the coating fails or the counter reaches 100,000 cycles. One cycle is one compression/one relaxation, two cycles is two compressions/ two relaxations.
[2]The flexibility test is also a test devised by NIKE Corp. using a Bally Flexometer. In the test a flexible polyurethane substrate of approximately 2.5 square centimeters and 2.5 centimeters in thickness coated as described above is placed in a jig and folded 90 degrees (coating side out) to simulate the bending experience by the front of an athletic shoe when used for running. The sample is given 20,000 folds and inspected for cracks in the coating. If no cracks are evidenced the sample is given another 20,000 folds and examined again crack in the coating. The testing is continued until the coating cracks.

What is claimed:

1. An article of manufacture comprising:
   a) a first substrate comprising a first flexible material; and
   b) a second substrate comprising a second flexible material different from the first flexible material,
   wherein at least a portion of the first substrate and at least a portion of the second substrate are coated with a waterborne coating composition comprising:
   i) at least one base neutralized active hydrogen containing film-forming resin;
   ii) a water dispersible carbodiimide crosslinker capable of reacting with the film-forming resin to form a cross-linked film wherein the water dispersible carbodiimide is a water dispersible oligomeric carbodiimide and/or a water dispersible polymeric carbodiimide, the water dispersible carbodiimide crosslinker comprises carbodiimide linkages, urethane linkages and urea linkages; and
   iii) a water dispersible polyisocyanate.

2. The article of manufacture of claim 1, wherein the active hydrogen containing film-forming resin comprises a polyurethane.

3. The article of manufacture of claim 1, wherein the first and second substrates independently comprise natural leather, synthetic leather, vinyl, nylon, thermoplastic urethane, fabric, foam and/or rubber.

4. A footwear comprising the article of manufacture of claim 3.

5. The article of manufacture of claim 1, wherein the first substrate comprises foam and the second substrate comprises synthetic and/or natural leather.

6. The article of manufacture of claim 1, wherein the coating further comprises a colorant.

7. The article of manufacture of claim 1, wherein the article of manufacture is footwear.

8. The article of manufacture of claim 7, wherein the footwear is an athletic shoe.

9. The article of manufacture of claim 1, wherein the first and/or second substrates comprise a polymeric bladder filled with air.

* * * * *